(12) United States Patent
Yan

(10) Patent No.: US 12,269,526 B1
(45) Date of Patent: Apr. 8, 2025

(54) MULTIFUNCTIONAL TROLLEY WITH ADJUSTABLE SIZE AND TRANSPORT METHOD FOR TRANSPORTING LOAD ON THE GROUND

(71) Applicant: Ruochun Yan, Guangdong (CN)

(72) Inventor: Ruochun Yan, Guangdong (CN)

( * ) Notice: Subject to any disclaimer, the term of this patent is extended or adjusted under 35 U.S.C. 154(b) by 0 days.

(21) Appl. No.: 18/780,864

(22) Filed: Jul. 23, 2024

(51) Int. Cl.
*B62B 3/02* (2006.01)

(52) U.S. Cl.
CPC ...................................... *B62B 3/02* (2013.01)

(58) Field of Classification Search
CPC ............ B62B 2301/08; B62B 2301/20; B62B 2301/22; B62B 2301/23; B62B 2301/254; B62B 2206/02; B62B 2206/04; B62B 5/0093; B62B 3/02
See application file for complete search history.

(56) References Cited

U.S. PATENT DOCUMENTS

| | | | | |
|---|---|---|---|---|
| 2,885,090 | A * | 5/1959 | Forman | A47F 7/24 211/175 |
| 4,166,638 | A * | 9/1979 | De Prado | B62D 21/14 280/638 |
| 5,018,930 | A * | 5/1991 | Hardin | B62B 5/0083 254/8 R |
| 5,465,996 | A * | 11/1995 | Wisz | A45C 13/385 280/35 |
| 6,036,219 | A * | 3/2000 | Oefelein | B62B 3/02 280/47.35 |
| 6,371,497 | B1 * | 4/2002 | Scire | B62B 5/0083 280/42 |
| 6,824,150 | B2 * | 11/2004 | Simione | A62C 3/00 280/47.371 |
| 6,824,152 | B1 * | 11/2004 | Scott | B62B 3/02 280/43.16 |
| 7,059,617 | B1 * | 6/2006 | Verna | B62B 5/0083 280/79.3 |
| 7,213,820 | B2 * | 5/2007 | Drummond | B60B 33/0005 280/79.11 |

(Continued)

FOREIGN PATENT DOCUMENTS

KR 20120117176 A * 10/2012

OTHER PUBLICATIONS

Translation of KR 10-2012-0117176 (Year: 2012).*

Primary Examiner — Katy M Ebner
(74) Attorney, Agent, or Firm — Hawaii Patent Services; Nathaniel K. Fedde; Kenton N. Fedde

(57) ABSTRACT

A multifunctional trolley with an adjustable size and a transportation method for transporting a load on the ground. The multifunctional trolley with an adjustable size comprises a first wheel block and a second wheel block that are arranged in parallel with each other and a center shaft block provided between the first wheel block and the second wheel block, wherein the first wheel block is provided with a first adjusting mechanism for adjusting the distance between the first wheel block and the center shaft block; the second wheel block is provided with a second adjusting mechanism for adjusting the distance between the second wheel block and the center shaft block; and both the first wheel block and the second wheel block are provided with bearing parts and wheel parts.

16 Claims, 4 Drawing Sheets

(56) References Cited

U.S. PATENT DOCUMENTS

| | | | |
|---|---|---|---|
| 7,762,198 B2* | 7/2010 | Rasmusson | B65D 19/44 |
| | | | 108/54.1 |
| 7,762,566 B2* | 7/2010 | Wang | B62B 5/0083 |
| | | | 280/651 |
| 8,944,442 B2* | 2/2015 | Tsai | B62B 3/02 |
| | | | 280/655 |
| 9,010,770 B2* | 4/2015 | Cantrell | B62B 5/062 |
| | | | 280/6.154 |
| 9,694,838 B2* | 7/2017 | Gullino | B62B 3/02 |
| 10,583,850 B1* | 3/2020 | Pospicil | B62B 1/26 |
| 11,117,608 B2* | 9/2021 | Turner, Jr. | B62B 5/0093 |
| 11,554,802 B2* | 1/2023 | Nooner | B62B 5/0093 |
| 11,584,418 B2* | 2/2023 | Turner, Jr. | B62B 5/0093 |
| 11,827,137 B1* | 11/2023 | Hassell | B60P 3/127 |
| 12,024,216 B2* | 7/2024 | Nooner | A63C 17/06 |
| 12,054,187 B2* | 8/2024 | Hanna | B62B 5/0083 |
| 12,065,183 B2* | 8/2024 | Laudani | B62B 3/02 |
| 2010/0237577 A1* | 9/2010 | Bolster | B62B 3/0643 |
| | | | 280/79.7 |
| 2013/0154216 A1* | 6/2013 | Paulk, Sr. | B62B 3/02 |
| | | | 280/79.11 |
| 2015/0197263 A1* | 7/2015 | Cantrell | B62B 3/02 |
| | | | 280/6.157 |
| 2015/0284040 A1* | 10/2015 | Dombrowsky | B62B 3/02 |
| | | | 224/42.23 |
| 2020/0130719 A1* | 4/2020 | Saeli | B62B 3/02 |
| 2023/0024997 A1* | 1/2023 | Hanlon | B62B 3/16 |
| 2023/0174131 A1* | 6/2023 | Hanna | B62B 5/0083 |

* cited by examiner

MULTIFUNCTIONAL TROLLEY WITH ADJUSTABLE SIZE AND TRANSPORT METHOD FOR TRANSPORTING LOAD ON THE GROUND

TECHNICAL FIELD

The present invention relates to the technical field of equipment supporting trolleys or carriers, in particular to a multifunctional trolley with adjustable size and a transportation method for transporting a load on the ground.

BACKGROUND

Trucks, trolleys, trolleys and the like have been developed for lifting, supporting and moving objects, such as vending machines, platforms, equipment and freezers, etc. They are usually moved to be placed in specific locations permanently or for a short time, such as trading fairs, lectures, festivals and other such activities, in which a large number of objects are brought alone and require a lot of manpower.

Many trolleys with wheels have been provided in the prior art and support a large number of loads. For example, U.S. Pat. No. 9,120,495 discloses a trolley for moving objects, which relates to a novel trolley for lifting and transporting relatively heavy and bulky objects, and U.S. Pat. No. 5,599,031A discloses a working trolley with adjustable height, width and length. Working trolleys with adjustable height, width and length include trolleys for movably supporting a load having an adjustable frame with side members and end members, but such trolleys may not move in a single desired direction when pushed, but may move in any of a plurality of undesired directions, and moreover, conventional trolleys are generally difficult to load and it is generally not easy to hold the load on the trolleys.

At the same time, the commonly used platform trolleys can't effectively deal with rugged terrain, and even if they are adjustable, they cannot be easily expanded and are usually not multifunctional. There is a need for a suitable solution. A multifunctional trolley with an adjustable size is proposed. The trolley has a load supporting platform, and the load can be positioned on the platform to be transported by the trolley, which can adapt to trolleys with various use scenarios and article sizes, reduce the risk of sliding and falling encountered by users in the transporting process, and improve the transporting efficiency and safety.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a multifunctional trolley with an adjustable size, which includes a first wheel block and a second wheel block which are arranged in parallel with each other, and a center shaft block arranged between the first wheel block and the second wheel block, wherein the first wheel block is provided with a first adjusting mechanism for adjusting a distance between the first wheel block and the center shaft block, and the second wheel block is provided with a second adjusting mechanism for adjusting a distance between the second wheel block and the center shaft block;

the multifunctional trolley further includes a first locking mechanism for releasably locking the first adjusting mechanism and a second locking mechanism for releasably locking the second adjusting mechanism, wherein the first locking mechanism locks the first adjusting mechanism to keep the distance between the first adjusting mechanism and the center shaft block, and the second locking mechanism locks the second adjusting mechanism to keep the distance between the second adjusting mechanism and the center shaft block.

The present invention further provides a multifunctional trolley with an adjustable size, which includes a first wheel block and a second wheel block which are arranged in parallel with each other, and a center shaft block which is arranged between the first wheel block and the second wheel block, wherein the first wheel block is provided with a first adjusting mechanism for adjusting a distance between the first wheel block and the center shaft block, the second wheel block is provided with a second adjusting mechanism for adjusting a distance between the second wheel block and the center shaft block, and both the first wheel block and the second wheel block are provided with bearing parts and wheel parts;

the first adjusting mechanism includes a first sliding rod set provided on the first wheel block, one end of the first sliding rod set is fixedly connected with the first wheel block, and the other end is sequentially connected with the center shaft block and the second wheel block in a sliding manner; the second adjusting mechanism includes a second sliding rod set provided on the second wheel block, one end of the second sliding rod set is fixedly connected with the second wheel block, and the other end is sequentially connected with the center shaft block and the first wheel block in a sliding manner.

The present invention further provides a transportation method for transporting a load on the ground, including:

providing a multifunctional trolley with an adjustable size, which includes a center shaft block and side blocks arranged on both sides of the center shaft block in parallel, wherein the side block is provided with an adjusting mechanism for adjusting a distance from the center shaft block and a locking mechanism for releasably locking keep a distance from the center shaft block, and the side blocks are also provided with wheel parts and bearing parts for supporting bearing objects;

the method includes the following steps:

extending the side blocks on both sides, and respectively pulling apart to increase the distance between the side blocks on both sides and the center shaft block;

placing at least one article on the multifunctional trolley with an adjustable size;

transporting the at least one article on a surface;
retracting the side blocks on both sides; and
storing the multifunctional trolley with an adjustable size.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

REFERENCE SIGNS

Figure 1:
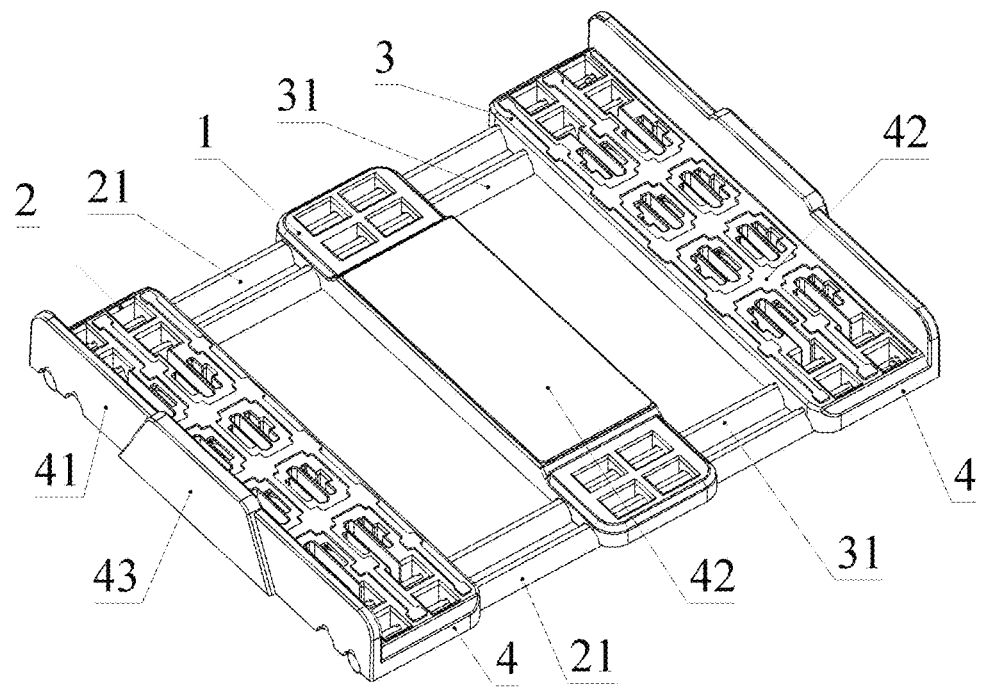
FIG. 1 is a schematic diagram of the overall structure of a multifunctional trolley with an adjustable size.

Center shaft block (1); First wheel block (2); Second wheel block (3); Bearing part (4); Wheel part (5); Ring portion (6); First center shaft seat (11); Second center shaft seat (12); First sliding rod set (21); First sliding rod (22); First spring post (23); First fixing hole (24); First left axle seat (25); First right axle seat (26); First lock hole (27); Second sliding rod set (31); Second sliding rod (32); Second spring post (33); Second fixing hole (34); Second left axle seat (35); Second right axle seat (36); Second lock hole (37); Railing (41); Reticular protrusion (42); Trapezoidal protrusion (43); Wheel axle seat (51); Wheel axle (52); Wheel (53); Connecting part (54); Supporting part (55); Floating groove (56).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 8, the present invention provides a multifunctional trolley with an adjustable size, which includes a first wheel block 2 and a second wheel block 3 which are arranged in parallel with each other, and a center shaft block 1 which is arranged between the first wheel block 2 and the second wheel block 3. The first wheel block 2 is provided with a first adjusting mechanism for adjusting the distance between the first wheel block 2 and the center shaft block 1, and the second wheel block 3 is provided with a second adjusting mechanism for adjusting the distance between the second wheel block 3 and the center shaft block 1.

Figure 3:
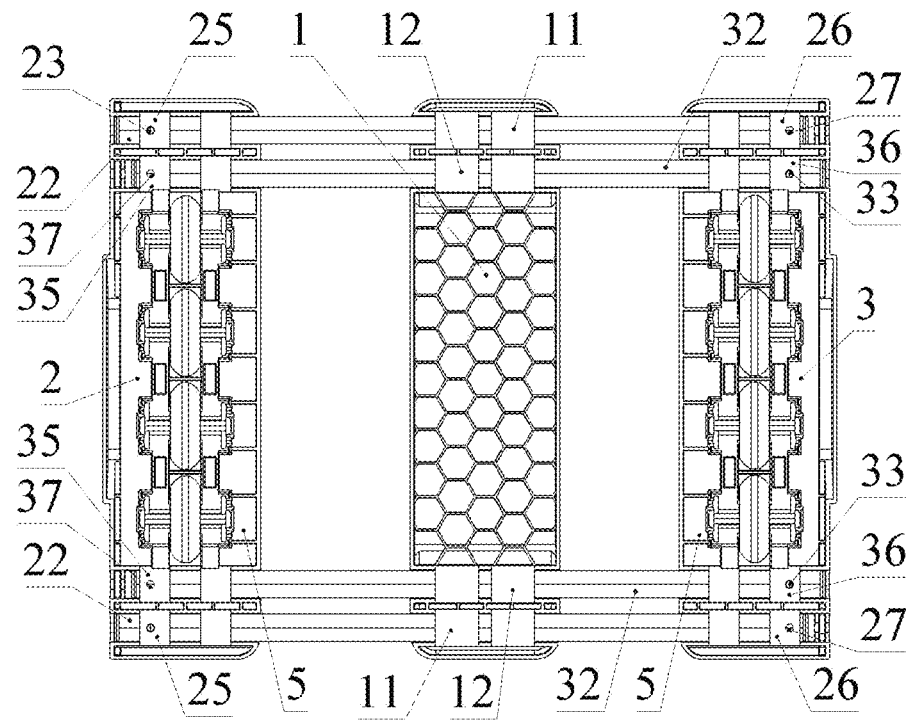
FIG. 3 is a schematic diagram of the bottom structure of the multifunctional trolley with an adjustable size.

As shown in FIG. 3, the bottom of the center axle block 1 is provided with a center shaft seat set, which includes a first center shaft seat 11, and the first adjusting mechanism includes a first sliding rod set 21 arranged at the bottom of the first wheel block 2, the first sliding rod set 21 penetrates from the first wheel block 2 to the center axle block 1 and is slidably connected with the first center shaft seat 11.

The trolley further includes a first locking mechanism for releasably locking the first adjusting mechanism and a second locking mechanism for releasably locking the second adjusting mechanism, wherein the first locking mechanism locks the first adjusting mechanism to keep the distance between the first adjusting mechanism and the center shaft block 1, and the second locking mechanism locks the second adjusting mechanism to keep the distance between the second adjusting mechanism and the center shaft block 1.

The bottom of the first wheel block 2 is provided with a first left axle seat 25, and the first sliding rod set 21 includes a first sliding rod 22 slidably arranged in the first left axle seat 25. One end of the first sliding rod 22 near the first wheel block 2 is provided with a retractable first spring post 23, and the first left axle seat 25 is provided with a first fixing hole 24, and the first spring post 23 extends out of the first fixing hole 24 to fix the first sliding rod 22 to the first left axle seat 25. The end of the first sliding rod 22 far away from the first wheel block 2 is also provided with a first spring post 23, and the first center shaft seat 11 is provided with a first axle hole matched with the first spring post 23. The first spring post 23 and the first shaft hole constitute a first locking mechanism.

The bottom of the second wheel block 3 is provided with a first right axle seat 26, and the first sliding rod set 21 passes from the first wheel block 2 to the second wheel block 3 via the first center shaft seat 11 and is slidably connected with the first right axle seat 26. The end of the first sliding rod 22 far from the first wheel block 2 is also provided with a first spring post 23, and the first right axle seat 26 is provided with a first lock hole 27 matched with the first spring post 23. The first spring post 23, the first lock hole 27 and the first center shaft hole form a first locking mechanism.

The center shaft seat set also includes a second center shaft seat 12, and the second adjusting mechanism includes a second sliding rod set 31 arranged at the bottom of the second wheel block 3. The first sliding rod set 21 penetrates from the first wheel block 2 to the center shaft block 1 and is slidably connected with the first center shaft seat 11, and the second sliding rod set 31 penetrates from the second wheel block 3 to the center shaft block 1 and is slidably connected with the second center shaft seat 12. The bottom of the second wheel block 3 is provided with a second right axle seat 36, and the second sliding rod set 31 includes a second sliding rod 32 slidably arranged in the second right axle seat 36. The end of the second sliding rod 32 near the second wheel block 3 is provided with a retractable second spring post 33, and the second right axle seat 36 is provided with a second fixing hole 34, and the second spring post 33 extends out of the second fixing hole 34 to fix the second sliding rod 32 to the second right axle seat 36. The end of the second sliding rod 32 far away from the second wheel block 3 is also provided with a second spring post 33, and the second center shaft seat 12 is provided with a second axle hole matched with the second spring post 33, and the second spring post 33 and the second axle hole form a second locking mechanism.

The bottom of the first wheel block 2 is provided with a second left axle seat 35, and the second sliding rod set 31 penetrates from the second wheel block 3 to the first wheel block 2 via the second center shaft seat 12 and is slidably connected with the second left axle seat 35. The end of the second sliding rod 32 far away from the second wheel block 3 is also provided with a second spring post 33, and the second left axle seat 35 is provided with a second lock hole 37 matched with the second spring post 33. The second spring post 33, the second lock hole 37 and the second center shaft hole form a second locking mechanism.

Figure 4:
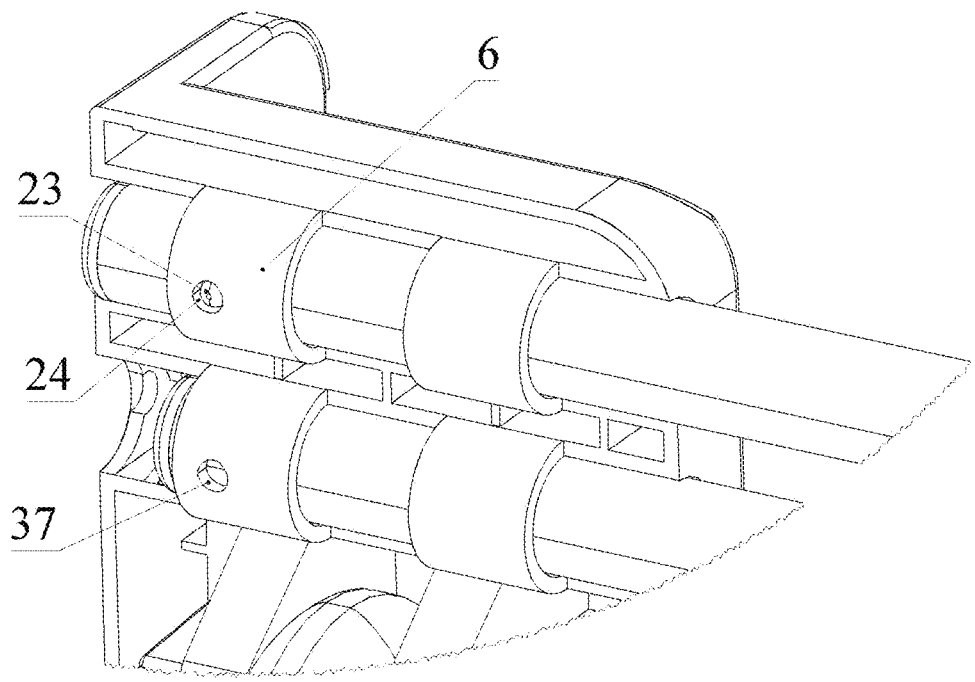
FIG. 4 is a schematic diagram of the local structure of the first wheel block of the multifunctional trolley with an adjustable size.
Figure 5:
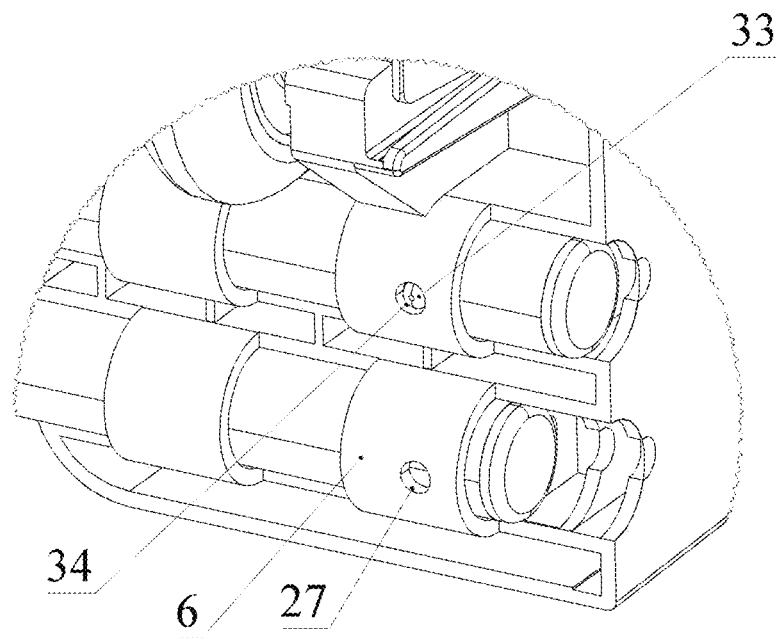
FIG. 5 is a schematic diagram of the partial structure of the second wheel block of the multifunctional trolley with an adjustable size.
Figure 7:
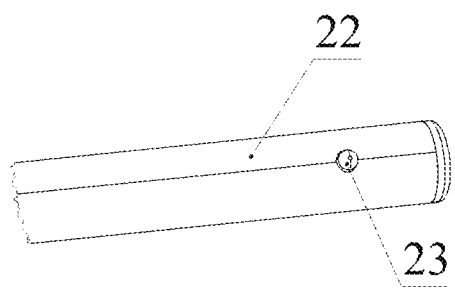
FIG. 7 is a partial schematic view of the end structure of the first sliding rod of the multifunctional trolley with an adjustable size.
Figure 8:
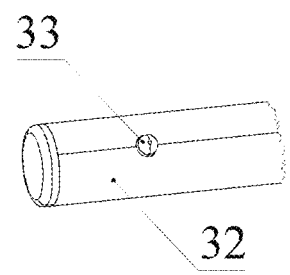
FIG. 8 is a partial schematic view of the end structure of the second sliding rod of the multifunctional trolley with an adjustable size.

As shown in FIG. 4 and FIG. 5, the first left axle seat 25, the first right axle seat 26, the second left axle seat 35, the second right axle seat 36, the first center shaft seat 11 and the second center shaft seat 12 all have the same axle seat structure, and each axle seat includes at least two circular ring parts 6 fixedly arranged, and the sliding rod set is slidably arranged in the axle seat through the circular ring parts 6, so as to ensure the smooth movement of the sliding rod set in the axle seat; as shown in FIG. 7 and FIG. 8, the first sliding rod set 21 and the second sliding rod set 31 have the same structure, and the sliding rod set includes sliding rods and spring posts arranged at both ends of the sliding rod. By opening holes corresponding to the spring posts (i.e. lock holes/fixing holes/center shaft holes) on the circular ring parts 6, the holes are used for fixing the spring posts on the sliding rod, which plays a role in limiting the sliding of the sliding rod set in the shaft seat and provides more choices for the fixing positions of the spring posts.

Wherein, the sliding rod is generally hollow tubular structure, which can not only reduce materials and save costs, but also reduce the weight of the sliding rod and improve its flexibility and portability. The two ends of the sliding rod protect the inside of the sliding rod through the sliding rod sleeve to prevent water, insects or various fine sandstone from entering it and damaging the overall strength of the sliding rod; the left and right ends of the sliding rod are respectively provided with a through hole along the sliding rod wall, and the spring post is generally cylindrical, and a corresponding elastic element (not shown) is connected below the spring post; one end of the spring post is installed inside the sliding rod through the elastic element, and the other end penetrates through the through hole and is exposed outside the sliding rod, and the spring post telescopically moves in the through hole through the elastic element, and is engaged with the hole opened on the circular ring part 6 through the exposed part of the spring post.

In some embodiments (not shown), the spring post in the sliding rod can be a spherical marble, a square elastic pin or a triangular elastic block. Using marbles as the design of spring posts can not only simplify the structure, but also provide elastic support and reduce friction during sliding, thus achieving smoother and more flexible sliding. Marble design can also reduce the material cost and manufacturing complexity, and improve the production efficiency and economy of products; Choosing the design of a spring pin as the spring post in the sliding rod can provide a larger contact area and fixing force, and increase the stability and seismic capacity between the sliding rod and the shaft seat. The design of the spring pin can also better bear the lateral force and impact force, ensure that the product can still have reliable performance in complex use environment and prolong the service life of the product.

In some embodiments (not shown), the circular ring part 6 of the center shaft seat is also provided with a hole, and the sliding rod can be fixed in the center shaft seat through the spring post, which provides more choices for the fixed position of the spring post. This design not only enhances the flexibility and adjustability of the product, but also provides certain stability for the maximum unfolded state of the multifunctional trolley with an adjustable size, ensuring the stability and durability of the trolley in different use scenarios.

As shown in FIG. 1, the bearing part 4 is provided with a railing 41 extending upward, and the railing 41 is arranged on the side of the first wheel block 2 or the second wheel block 3 far away from the center shaft block 1. The railing 41 presents a regular rectangular shape to ensure that it has sufficient bearing capacity during use. On the middle section of the side of the railing 41 far away from the center shaft block 1, there is a trapezoidal protrusion 43 with a reinforced structure. The existence of this trapezoidal protrusion 43 makes the whole railing 41 have higher torsional strength, thus improving the stability and reliability of the trolley. The trapezoidal protrusion 43 of the reinforcing structure not only strengthens the railing itself, but also does not increase the weight and complexity of the product too much. Through this design, the railing 41 can maintain its stability and structural integrity while bearing the load, effectively improving the service life and safety of the product;

The side of the railing 41 close to the center shaft block 1 is flat, which ensures that the railing has a large contact area when contacting with goods, thus improving the stability and bearing capacity of the whole structure. The fillet transition arranged along the peripheral edge of the railing 41 not only beautifies the appearance of the product, but also effectively avoids the scratch and damage of the surface of the article caused by the collision with the railing when carrying the article. This design can reduce the possibility of accidental damage when handling articles to a certain extent, and improve the overall texture of the product.

The bearing part 4 and the upper surface of the center shaft block 1 are provided with reticular protrusions 42 to enhance the friction and anti-skid performance. The design of the reticular protrusion 42 can not only effectively improve the stability of the product in the use process, but also prevent the article from slipping in the handling process, resulting in accidental falling and damage. In addition, the design of the reticular protrusions 42 can also be beneficial to drainage and prevent water or other liquids from accumulating on the surface of the bearing part 4, thus further improving the anti-skid performance of the product.

The center axle block 1 of the trolley is fixed in the center, and the left and right wheel blocks extend or contract to both sides along four steel circular tubes through an adjusting mechanism. The adjustment mechanism is realized by the embedded slide rail and locking device, and the user can adjust the width of the trolley according to the needs to adapt to articles of different sizes. When large-size articles need to be moved, the left and right wheel blocks are pulled to both sides along the steel pipe; when articles need to be moved in a narrow space, the wheel block is contracted towards the center shaft block 1. The four steel pipes not only provide the connection function, but also provide enough torsion when the trolley passes through different undulating roads to ensure the stability of the trolley body. The bearing part 4 and the panel of the center shaft block 1 are made of TPE rubber, and the reticulation secondary injection molding process increases the friction force. In addition, the design of the railing 41 of the wheel block effectively prevents the transported articles from sliding and falling during the moving process.

Figure 6:
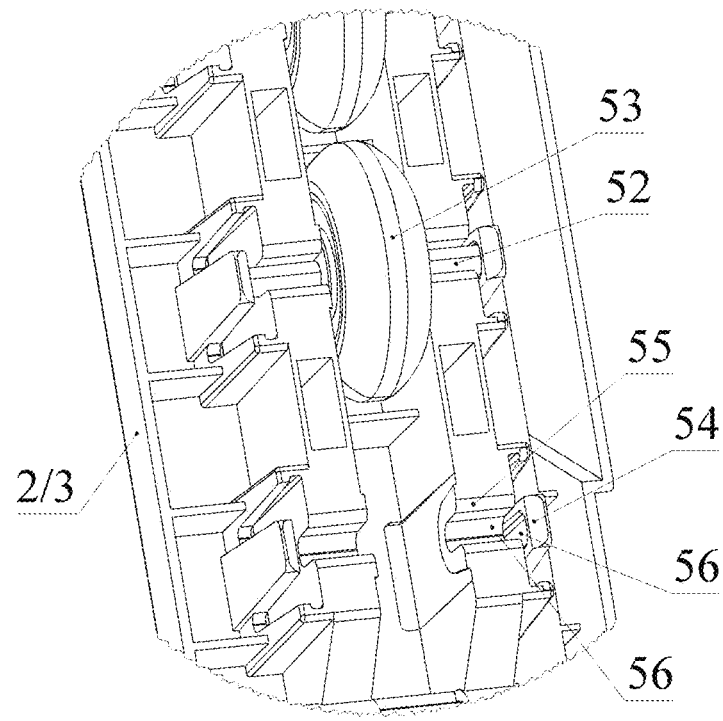
FIG. 6 is a schematic view of the wheel structure of the multifunctional trolley with an adjustable size.

As shown in FIG. 6, the wheel part 5 includes an in-line wheel composed of a plurality of wheels 53 arranged in a row. The wheel part 5 includes a wheel axle 52 and wheel axle seats 51 respectively arranged at the bottoms of the first wheel block 2 and the second wheel block 3. The wheel axle 52 is rotatably arranged in the wheel axle seat 51, and the middle section of the wheel axle 52 is connected with a wheel 53, and a buffer for buffering the wheel axle 52 is arranged in the wheel axle seat 51. The wheel 53 is made of TPR+ABS composite material and manufactured by secondary injection molding process, and ABS plastic is used as the hub to ensure the hard strength of the wheel; As a tire part, TPR rubber protects indoor floor and outdoor pavement. The cross section of the wheel 53 is V-shaped, and the bottom of each wheel block is arranged by four wheels 53 in a row, which is similar to a tank track, so it can easily pass through various uneven roads when driving, and has strong grip and stability.

Among them, the V-shaped cross section of the wheel 53 can not only reduce the friction surface between the wheel 53 and the indoor floor to avoid scratching the indoor floor, but also increase the friction of the wheel 53 on the outdoor ground, providing a stronger grip for the trolley when it is transported outdoors. The V-shaped wheel has good performance in both indoor and outdoor use scenarios. In addition, the V-shaped wheels can also reduce the noise and vibration of the trolley during driving, providing users with a more comfortable experience.

The wheel axle seat 51 includes connecting parts 54 arranged at two opposite sides and supporting parts 55 for supporting the wheel axle 52. The connecting parts 54 are located at both sides of the wheel axle seat 51, and both ends of the wheel axle 52 are rotatably connected to the connecting parts 54 at both sides of the wheel axle seat 51. The supporting part 55 is used to support the wheel axle 52. The connecting part 54 and the supporting part 55 are both provided with floating grooves 56 for the wheel axle 52 to float up and down, and the floating grooves 56 of the supporting part 55 are provided with a buffer for buffering the wheel axle 52. The design of the axle seat 51 allows the user to easily replace the damaged wheel axle 52 or wheel 53. The user can replace the damaged wheel axle 52 or wheel 53 by operating the connecting part 54, thus prolonging the service life of the wheel axle seat 51. In some embodiments (not shown), the buffer can be a rubber pad arranged in the floating groove 56 of the support part 55, which provides buffering and elastic performance when the wheel axle 52 floats up and down to adapt to different road surfaces; At the same time, the buffer element can also be an elastic element arranged in the floating groove 56 of the connecting part 54, which provides cushioning and elastic performance when the wheel axle 52 floats up and down, and provides a more stable use experience.

In family and small business scenes, the multifunctional trolley with an adjustable size can be flexibly adjusted according to the size of the goods and the use environment, and provides a stable and efficient handling experience through innovative wheel design and telescopic mechanism, which is suitable for various different floors and roads, and can effectively solve the shortcomings of the existing trolleys in adaptability and safety, and has a broad application prospect.

Traditional trolleys are divided into indoor and outdoor types. Indoor trolleys mostly use small soft wheels, while outdoor trolleys use large hard wheels. The limitations of the existing trolleys in size and applicable scenes, as well as the problem that the transported articles are easy to slide down, cause users to encounter many inconveniences in the use process.

Figure 2:
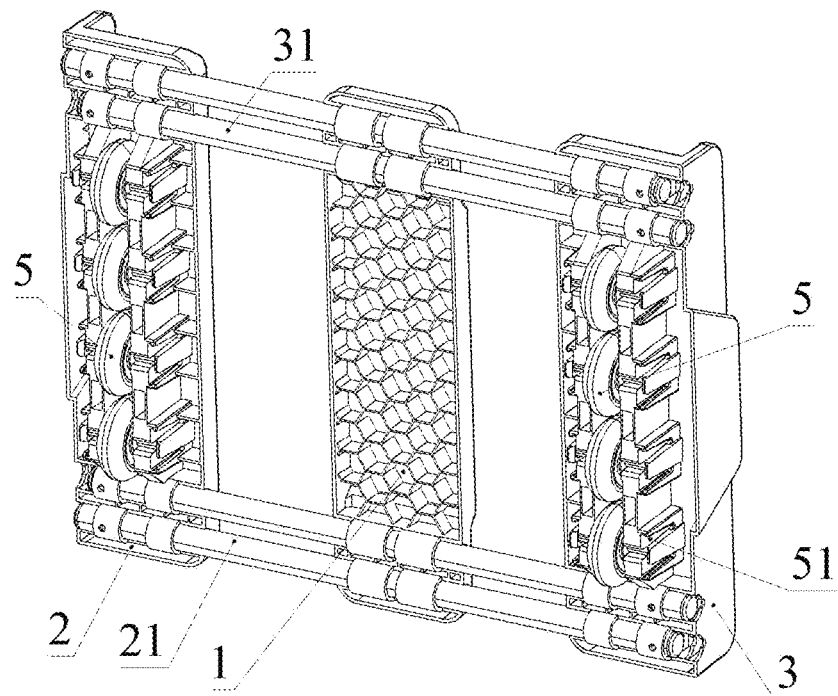
FIG. 2 is another schematic view of the overall structure of the multifunctional trolley with an adjustable size.

The present invention further provides a multifunctional trolley with an adjustable size, which includes a first wheel block 2 and a second wheel block 3 which are arranged in parallel with each other, and a center shaft block 1 which is arranged between the first wheel block 2 and the second wheel block 3. The first wheel block 2 is provided with a first adjusting mechanism for adjusting the distance between the first wheel block 2 and the center shaft block 1, and the second wheel block 3 is provided with a second adjusting mechanism for adjusting the distance between the second wheel block 3 and the center shaft block 1, and both the first wheel block 2 and the second wheel block 3 are provided with bearing parts 4 and wheel parts 5;

as shown in FIG. 1 and FIG. 2, the first adjusting mechanism includes a first sliding rod set 21 arranged on the first wheel block 2, one end of the first sliding rod set 21 is fixedly connected with the first wheel block 2, and the other end of the first sliding rod set 21 is slidably connected with the center shaft block 1 and the second wheel block 3 in turn; the second adjusting mechanism includes a second sliding rod set 31 arranged on the second wheel block 3, one end of the second sliding rod set 31 is fixedly connected with the second wheel block 3, and the other end of second sliding rod set 31 is slidably connected with the center shaft block 1 and the first wheel block 2 in turn; the trolley further includes a first locking mechanism for releasably locking the first adjusting mechanism and a second locking mechanism for releasably locking the second adjusting mechanism, wherein the first locking mechanism locks the first adjusting mechanism to keep the distance between the first adjusting mechanism and the center shaft block 1, and the second locking mechanism locks the second adjusting mechanism to keep the distance between the second adjusting mechanism and the center shaft block 1; the first locking mechanism includes a first locking element arranged on the center shaft block 1 and/or the second wheel block 3 to lock the first sliding rod set 21 and limit its sliding; the second locking mechanism includes a second locking element arranged on the center axle block 1 and/or the first wheel block 2 to lock the second sliding rod set 31 and limit its sliding.

Wherein, the first adjusting mechanism and the second adjusting mechanism have the same structure. The sliding rod set includes a sliding rod sleeve, two sliding rods arranged at the bottom of the wheel block and spring posts arranged on the sliding rods. Wherein, the sliding rod is generally hollow tubular structure, which can not only reduce materials and save costs, but also reduce the weight of the sliding rod and improve the flexibility of the adjusting mechanism; the two ends of the sliding rod protect the inside of the sliding rod through the sliding rod sleeve to prevent water, insects or various fine sandstone from entering it and damaging the overall strength of the sliding rod; one end of the sliding rod far away from the wheel block is provided with a through hole, and the spring post is generally cylindrical, and a corresponding elastic element (not shown) is connected below the spring post; one end of the spring post is installed inside the sliding rod through the elastic element, and the other end is exposed outside the sliding rod through the through hole; the spring post is telescopically movable in the through hole through the elastic element, and is engaged with the first locking element or the second locking element through the exposed part of the spring post.

In some embodiments (not shown), a plurality of through holes are uniformly formed in the elongation direction of the sliding rod, and spring posts are arranged in these through holes, so that the user can adjust the position of the wheel block relative to the center shaft block by operating the adjusting mechanism to make the axle seat cooperate with different spring posts; the spring post part is limited to a cylindrical shape, and the spring post can also be a ball-shaped marble, a square elastic block or a triangular elastic block, and the sliding stroke of the sliding rod set is limited by arranging corresponding elastic elements in the sliding rod and clamping them in the shaft seat;

the first locking mechanism and the second locking mechanism have the same structure, and the locking mechanism includes a shaft seat and a locking element fixedly connected with the shaft seat; the locking element is provided with a hole (namely a lock hole/a fixing hole/a center shaft hole) corresponding to the spring post, which is used for fixing the spring post on the sliding rod, and plays a role in limiting the sliding rod set when sliding in the shaft seat, thus providing more choices for the fixed position of the spring post. Specifically, the wheel blocks on both sides are based on the center shaft block 1, and the user operates the locking mechanism of the adjustment mechanism to unlock the sliding rod set from the locked state, and moves the wheel blocks on both sides to appropriate positions, and then operates the locking mechanism to lock the sliding rod set in the corresponding position. Based on the above structure, the trolley can be opened to the maximum unfolded state for transporting large articles. When the wheels arranged on the left and right wheel blocks encounter uneven ground, the special structure with the center shaft block 1 can bear certain torsion, and its structure is similar to that of a torsion beam. As shown in FIG. 1, the bearing part 4 is provided with an upwardly extending railing 41, which is arranged on the side of first wheel block 2 or the second wheel block 3 away from the center axle block 1; the railing 41 is generally rectangular, and its side away from the center axle block 1 is provided with a trapezoidal protrusion 43 with a reinforced the structure, and the trapezoidal protrusion 43 has a certain reinforcing effect on the overall strength of the railing 41; one side of the railing 41 close to the center shaft block 1 is flat, and there are rounded corners along the periphery of the railing 41, which can prevent users from scratching the surface of articles when carrying them.

Wherein, the bearing part 4 and the upper surface of the center shaft block 1 are both provided with reticular protrusions 42 to enhance friction and anti-skid performance. The design of the reticular protrusions 42 can not only effectively improve the stability of the product in the use process, but also prevent the article from slipping in the handling process, resulting in accidental falling and damage. In addition, the design of the reticular protrusions 42 can also be beneficial to drainage and prevent water or other liquids from accumulating on the surface of the bearing part 4, thus further improving the anti-skid performance of the product.

As shown in FIG. 6, the wheel part 5 includes an in-line wheel composed of a plurality of wheels 53 arranged in a row. The wheel part 5 includes a wheel axle 52 and wheel axle seats 51 respectively arranged at the bottoms of the first wheel block 2 and the second wheel block 3. The wheel axle 52 is rotatably arranged in the wheel axle seat 51, and the middle section of the wheel axle 52 is connected with a wheel 53, and a buffer for buffering the wheel axle 52 is arranged in the wheel axle seat 51. The wheel 53 is made of TPR+ABS composite material and manufactured by secondary injection molding process, and ABS plastic is used as the hub to ensure the hard strength of the wheel; as a tire part, TPR rubber protects indoor floor and outdoor pavement. The cross section of the wheel 53 is V-shaped, and the bottom of each wheel block is arranged by four wheels 53 in a row, which is similar to a tank track, so it can easily pass through various uneven roads when driving, and has strong grip and stability.

Wherein, the V-shaped cross section of the wheel 53 can not only reduce the friction surface between the wheel 53 and the indoor floor to avoid scratching the indoor floor, but also increase the friction of the wheel 53 on the outdoor ground, providing a stronger grip for the trolley when it is transported outdoors. The V-shaped wheel has good performance in both indoor and outdoor use scenarios. In addition, the V-shaped wheels can also reduce the noise and vibration of the trolley during driving, providing users with a more comfortable experience.

The wheel axle seat 51 includes connecting parts 54 arranged at two opposite sides and supporting parts 55 for supporting the wheel axle 52. The connecting parts 54 are located at both sides of the wheel axle seat 51, and both ends of the wheel axle 52 are rotatably connected to the connecting parts 54 at both sides of the wheel axle seat 51. The supporting part 55 is used to support the wheel axle 52. The connecting part 54 and the supporting part 55 are both provided with floating grooves 56 for the wheel axle 52 to float up and down, and the floating groove 56 of the supporting part 55 is provided with a buffer for buffering the wheel axle 52. The design of the axle seat 51 allows the user to easily replace the damaged wheel axle 52 or wheel 53. The user can replace the damaged wheel axle 52 or wheel 53 by operating the connecting part 54, thus prolonging the service life of the wheel axle seat 51. In some embodiments (not shown), the buffer can be a rubber pad arranged in the floating groove 56 of the support part 55, which provides buffering and elastic performance when the wheel axle 52 floats up and down to adapt to different road surfaces; at the same time, the buffer element can also be an elastic element arranged in the floating groove 56 of the connecting part 54, which provides cushioning and elastic performance when the wheel axle 52 floats up and down, and provides a more stable use experience.

In family and small business scenes, the trolley can be flexibly adjusted according to the size of the goods and the use environment. Through innovative wheel design and telescopic mechanism, it provides a stable and efficient handling experience and is suitable for various floors and roads.

The present invention further provides a transportation method for transporting a load on the ground, which includes the following steps:

providing a multifunctional trolley with an adjustable size, which includes a center shaft block 1 and side block arranged on both sides of the center shaft block 1 in parallel, wherein the side blocks are provide with an adjusting mechanism for adjusting the distance from the center shaft block 1 and a locking mechanism for releasably locking to keep the distance from the center shaft block 1, and the side blocks are also provided with a wheel part 5 and a bearing part 4 for supporting load-bearing objects;

the method includes the following steps:

extending the side blocks on both sides, and respectively pulling apart to increase the distance between the side blocks on both sides and the center shaft block;

placing at least one article on the multifunctional trolley with an adjustable size;

transporting the at least one article on a surface;

retracting the side blocks on both sides; and storing the multifunctional trolley with an adjustable size.

This trolley is suitable for personal family, small business and other scenes, which can effectively solve the shortcomings of existing trolleys in adaptability and safety, and has a wide application prospect and market value.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A multifunctional trolley with an adjustable size, comprising a first wheel block and a second wheel block which are arranged in parallel with each other, and a center shaft block arranged between the first wheel block and the second wheel block, wherein the first wheel block is provided with a first adjusting mechanism for adjusting a distance between the first wheel block and the center shaft block, and the second wheel block is provided with a second adjusting mechanism for adjusting a distance between the second wheel block and the center shaft block and both the first wheel block and the second wheel block are provided with bearing parts and wheel parts;

wherein the multifunctional trolley further comprises a first locking mechanism for releasably locking the first adjusting mechanism and a second locking mechanism for releasably locking the second adjusting mechanism, wherein the first locking mechanism locks the first adjusting mechanism to keep the distance between the first adjusting mechanism and the center shaft block, and the second locking mechanism locks the second adjusting mechanism to keep the distance between the second adjusting mechanism and the center shaft block;

wherein a bottom of the center shaft block is provided with a center shaft seat set, which comprises a first center shaft seat;

wherein the first adjusting mechanism comprises a first sliding rod set arranged at a bottom of the first wheel block, and the first sliding rod set penetrates from the first wheel block to the center shaft block and is slidably connected with the first center shaft seat; and wherein a bottom of the first wheel block is provided with a first left axle seat, and the first sliding rod set comprises a first sliding rod slidably arranged in the first left axle seat.

2. The multifunctional trolley with an adjustable size according to claim 1, wherein a retractable first spring post is arranged on an end of the first sliding rod near the first wheel block, a first fixing hole is formed on the first left axle seat, and the retractable first spring post extends out of the first fixing hole to fix the first sliding rod to the first left axle seat.

3. The multifunctional trolley with an adjustable size according to claim 2, wherein an end of the first sliding rod far away from the first wheel block is also provided with a first spring post, and the first center shaft seat is provided with a first center shaft hole matched with the first spring post, and the first spring post and the first center shaft hole form the first locking mechanism.

4. The multifunctional trolley with an adjustable size according to claim 2, wherein a bottom of the second wheel block is provided with a first right axle seat, and the first sliding rod set penetrates from the first wheel block to the second wheel block via the first center shaft seat and is slidably connected with the first right axle seat.

5. The multifunctional trolley with an adjustable size according to claim 4, wherein an end of the first sliding rod far away from the first wheel block is also provided with a first spring post, the first center shaft seat is provided with a first center shaft hole matched with the first spring post, the first right axle seat is provided with a first lock hole matched with the first spring post, and the first spring post, the first lock hole and the first center shaft hole form the first locking mechanism.

6. A multifunctional trolley with an adjustable size, comprising a first wheel block and a second wheel block which are arranged in parallel with each other, and a center shaft block arranged between the first wheel block and the second wheel block;

wherein the first wheel block is provided with a first adjusting mechanism for adjusting a distance between the first wheel block and the center shaft block, and the second wheel block is provided with a second adjusting mechanism for adjusting a distance between the second wheel block and the center shaft block and both the first wheel block and the second wheel block are provided with bearing parts and wheel parts;

wherein the multifunctional trolley further comprises a first locking mechanism for releasably locking the first adjusting mechanism and a second locking mechanism for releasably locking the second adjusting mechanism, wherein the first locking mechanism locks the first adjusting mechanism to keep the distance between the first adjusting mechanism and the center shaft block, and the second locking mechanism locks the second adjusting mechanism to keep the distance between the second adjusting mechanism and the center shaft block;

wherein a bottom of the center shaft block is provided with a center shaft seat set, which comprises a first center shaft seat;

wherein the first adjusting mechanism comprises a first sliding rod set arranged at a bottom of the first wheel block, and the first sliding rod set penetrates from the first wheel block to the center shaft block and is slidably connected with the first center shaft seat;

wherein the center shaft seat set further comprises a second center shaft seat, and the second adjusting mechanism comprises a second sliding rod set arranged at a bottom of the second wheel block, wherein the first sliding rod set penetrates from the first wheel block to the center shaft block and is slidably connected with the first center shaft seat, and the second sliding rod set penetrates from the second wheel block to the center shaft block and is slidably connected with the second center shaft seat; and wherein the bottom of the second wheel block is provided with a second right axle seat, and the second sliding rod set comprises a second sliding rod slidably arranged in the second right axle seat.

7. The multifunctional trolley with an adjustable size according to claim 6, wherein a retractable second spring post is arranged on an end of the second sliding rod near the second wheel block, a second fixing hole is formed on the second right axle seat, and the retractable second spring post extends out of the second fixing hole to fix the second sliding rod to the second right axle seat.

8. The multifunctional trolley with an adjustable size according to claim 7, wherein an end of the second sliding rod far from the second wheel block is also provided with a second spring post, the second center shaft seat is provided with a second center shaft hole matched with the second spring post, and the second spring post and the second center shaft hole form the second locking mechanism.

9. The multifunctional trolley with an adjustable size according to claim 7, wherein the bottom of the first wheel block is provided with a second left axle seat, and the second sliding rod set penetrates from the second wheel block to the first wheel block via the second center shaft seat and is slidably connected with the second left axle seat.

10. The multifunctional trolley with an adjustable size according to claim 9, wherein an end of the second sliding rod far away from the second wheel block is also provided with a second spring post, the second center shaft seat is provided with a second center shaft hole matched with the second spring post, the second left axle seat is provided with a second lock hole matched with the second spring post, and the second spring post, the second lock hole and the second center shaft hole form the second locking mechanism.

11. The multifunctional trolley with an adjustable size according to claim 1, wherein each of the bearing parts is provided with a railing extending upwards, and the railing of each of the bearing parts is arranged on a side of the first wheel block or the second wheel block far from the center shaft block.

12. The multifunctional trolley with an adjustable size according to claim 1, wherein each of the wheel parts comprises an in-line wheel composed of a plurality of wheels arranged in a row.

13. The multifunctional trolley with an adjustable size according to claim 1, wherein each of the wheel parts comprises wheel axles and wheel axle seats respectively arranged at the bottom of the first wheel block and the second wheel block, wherein the wheel axles are rotatably arranged in the wheel axle seats, a middle section of each of the wheel axles is connected with a respective wheel, and a buffer for buffering a wheel axle of the wheel axles is arranged in the respective wheel axle seat.

14. The multifunctional trolley with an adjustable size according to claim 7, wherein, each of the wheel axle seats comprises connecting parts opposite to each other arranged at two sides and a supporting part for supporting the respective wheel axle; two ends of the respective wheel axle are rotatably connected to the connecting parts at both sides, floating grooves for the respective wheel axle to float up and down are formed in both the connecting part and the supporting part, and a buffer piece for buffering the respective wheel axle is arranged in the floating groove of the supporting part.

15. A multifunctional trolley with an adjustable size, comprising a first wheel block and a second wheel block which are arranged in parallel with each other, and a center shaft block which is arranged between the first wheel block and the second wheel block, wherein the first wheel block is provided with a first adjusting mechanism for adjusting a distance between the first wheel block and the center shaft block, the second wheel block is provided with a second adjusting mechanism for adjusting a distance between the second wheel block and the center shaft block, and both the first wheel block and the second wheel block are provided with bearing parts and wheel parts; and the first adjusting mechanism comprises a first sliding rod set provided on the first wheel block, one end of the first sliding rod set is fixedly connected with the first wheel block, and the other end is sequentially connected with the center shaft block and the second wheel block in a sliding manner; the second adjusting mechanism comprises a second sliding rod set provided on the second wheel block, one end of the second sliding rod set is fixedly connected with the second wheel block, and the other end is sequentially connected with the center shaft block and the first wheel block in a sliding manner.

16. The multifunctional trolley with an adjustable size according to claim 15, further comprising a first locking mechanism for releasably locking the first adjusting mechanism and a second locking mechanism for releasably locking the second adjusting mechanism, wherein the first locking mechanism locks the first adjusting mechanism to keep a distance between the first adjusting mechanism and the center shaft block, and the second locking mechanism locks the second adjusting mechanism to keep a distance between the second adjusting mechanism and the center shaft block;

the first locking mechanism comprises a first locking element arranged on the center shaft block and/or the second wheel block to lock the first sliding rod set to limit the sliding thereof, and the second locking mechanism comprises a second locking element arranged on the center shaft block and/or the first wheel block to lock the second sliding rod set to limit the sliding thereof.

* * * * *